United States Patent [19]

Mori

[11] Patent Number: 5,365,820
[45] Date of Patent: Nov. 22, 1994

[54] DEVICE FOR MOVING A HORIZONTAL LONG ARTICLE VERTICALLY

[75] Inventor: Chuzo Mori, Tokyo, Japan

[73] Assignee: Carl Manufacturing Co., Ltd., Tokyo, Japan

[21] Appl. No.: 76,096

[22] Filed: Jun. 14, 1993

[30] Foreign Application Priority Data

Jun. 18, 1992 [JP] Japan .................. 4-186268
Jun. 18, 1992 [JP] Japan .................. 4-186269

[51] Int. Cl.⁵ ............................................ B26D 1/18
[52] U.S. Cl. .................................. 83/455; 83/485; 83/588; 83/614; 248/655; 269/1
[58] Field of Search ............... 83/455, 456, 485, 588, 83/614, 382; 269/1, 73, 309, 310; 248/618, 655

[56] References Cited

U.S. PATENT DOCUMENTS 3,237,497  3/1966  Cook ........................ 83/455 X
3,301,117  1/1967  Spaulding .................. 83/614 X
5,069,097  12/1991 Mori ........................ 83/614 X

FOREIGN PATENT DOCUMENTS 63-26776  2/1988  Japan .

Primary Examiner—Eugenia Jones
Attorney, Agent, or Firm—Oliff & Berridge

[57] ABSTRACT

A device for moving a long article vertically, while always being held in a horizontal position, regardless of where and in what direction a force is exerted on the long article, and for use in, for example, a paper cutting machine has two actuation levers, each with two sloped end portions that are juxtaposed such that their slopes are opposed to each other. A bedplate is provide with guide members fixed on the two end portions of the bedplate for guiding the actuation levers to slide horizontally in parallel to each other. Drive members attached to the long article are mounted on the guide members and are associated with compression springs for biasing the drive members in an upward direction and to a predetermined height. The drive members are guided by the guide members to slide vertically and against the bias of the spring to abut the sloped end portions of the two actuation members such that the actuation levers are horizontally moved. This horizontal movement, and the interaction of the sloped end portions with the drive members causes the long article to be moved vertically while maintaining its horizontal orientation.

3 Claims, 5 Drawing Sheets

DEVICE FOR MOVING A HORIZONTAL LONG ARTICLE VERTICALLY

BACKGROUND OF THE INVENTION

1. Field of the Invention

The present invention relates to a device for moving a long article vertically, while holding it always in a horizontal position, no matter what portion of the long article might be pushed, and a paper cutting machine utilizing the device.

2. Description of the Prior Art

The prior art will be described by referring to a paper cutting machine as an example of the long article. As shown in FIG. 7, for example, the paper cutting machine is constructed such that a rail 3 is supported at one end on a bedplate 1 by a support 2 and such that a paper holder 4 is carried on the rail 3 so as to move toward and away from the rail 3. In the cutting operation of paper using this cutting machine, the rail 3, which has its base portion supported by the support 2, is pulled up at its other, free end portion, and the sheets of paper to be cut are placed on the bedplate 1. Next, the rail 3 is pushed down on its base portion to hold the paper with the paper holder 4, until a locking mechanism 6 carried on the free end portion of the rail 3 is retained by a retainer 7 which is fixed on the bedplate 1, thereby to maintain the holding of the paper by the paper holder 4. Next, a slider 5 (as should be referred to Japanese Utility Model Application No. 26776/1988) fitted on the rail 3 is slid to cut the paper by a rotary blade which is carried on the slider 5. Moreover, the cutting of the paper is positioned with respect to the edge of the paper holder 4 so that the rotary blade cuts the paper while turning with its side face contacting with the edge of the paper holder 4.

The paper cutting machine thus constructed will raise no serious problem if the number of sheets of paper placed on the bedplate is small. If this number is large, the paper sheets are held at first from the side of the base end of the rail by the paper holder because the paper holder moves together with the rail when the rail is depressed on its base end. As a result, the stacked sheets of paper are displaced by the depression of the paper holder. If the cutting operation is carried out in the state of displacement, the sheets of paper cannot be accurately cut, resulting in irregular edges. For positioning the cutting of the paper sheets, moreover, the paper holder has its leading end raised together with the rail from the base end of the rail so that the cutting position is difficult to determine with reference to the edge of the paper holder. In addition, the cutting operation cannot be started before the cutting position is confirmed by depressing the rail several times. After these positioning operations, the stacked sheets of paper are so displaced that they cannot be cut to an accurate size.

In order to prevent the displacement of the paper sheets and to facilitate the positioning of the cutting operation, it is sufficient to move the paper holder or the rail vertically in parallel with the bedplate. In order that the rail may be able to move vertically while being in parallel with the bedplate, the rail has to be moved down vertically in parallel with the bedplate no matter what position of the rail or the paper holder such as the free end portion of the rail might be depressed. This is because the slider may be located in any position to depress the rail therethrough.

SUMMARY OF THE INVENTION

Although the foregoing description is directed to the paper cutting machine, for example, this cutter has the mechanical element which is required to move vertically up and down while holding the long article such as the rail or paper holder of the paper cutting machine in its entirety in the horizontal position, in which it remains parallel to a base or bedplate, even if the long article is depressed at any location thereon.

Therefore, the present invention has been conceived to satisfy that requirement and has an object to provide such a device for moving a long article vertically, while maintaining it in parallel with a base, so as to satisfy the requirement.

The present invention thus constructed has the following operations. Specifically, a driven member is provided in abutment against the sloped portions of two parallel actuation levers. As a result, if the driven member, which is movable at a right angle relative to a support, is depressed, this push-down force is converted into a horizontal force to move the actuation levers horizontally due to the sloped portions on first ends of the actuation levers abutting the driven member. Moreover, the two parallel actuation levers have their individual two end portions supported slidably by the support and their other, second sloped ends fitted between the support and the driven member. As a result, when the actuation levers are horizontally moved by the horizontal force to cause their other, second sloped ends to be fitted between the support and the driven member, the horizontal force is converted into a force to pull down the driven member.

Moreover, each of the two actuation levers is formed at its two ends with the slopes. The slopes on the same actuation lever extend in the same direction. These two actuation levers are arranged so that the directions of inclination of the slopes formed at the two ends of one actuation lever are opposed to the directions of inclination of the slopes formed at the two ends of the other actuation lever. As a result, the pull-down force of the driven member is converted by the driven member, which is in abutment against the slope of the other of the two parallel actuation levers, into the horizontal force, which can be converted into the pull-down force to pull down the driven member through the other slope fitted between the supports and the driven member.

Thus, the push-down force to be applied through the driven member to one slope of a first one of the two parallel actuation levers is converted into the pull-down force to pull down the driven member by the other slope of the first actuation member. This force to pull-down the driven member acts as the force for pushing one slope of the second one of the two parallel actuation levers. This pushing force is converted through the slope into the horizontal force, which can be converted by the other slope of the second actuation lever into the force to pull down the driven member. As a result, the driven member can be vertically moved up and down while keeping its horizontal position even if it is depressed at an arbitrary position.

DESCRIPTION OF THE PREFERRED EMBODIMENT

Figure 3:
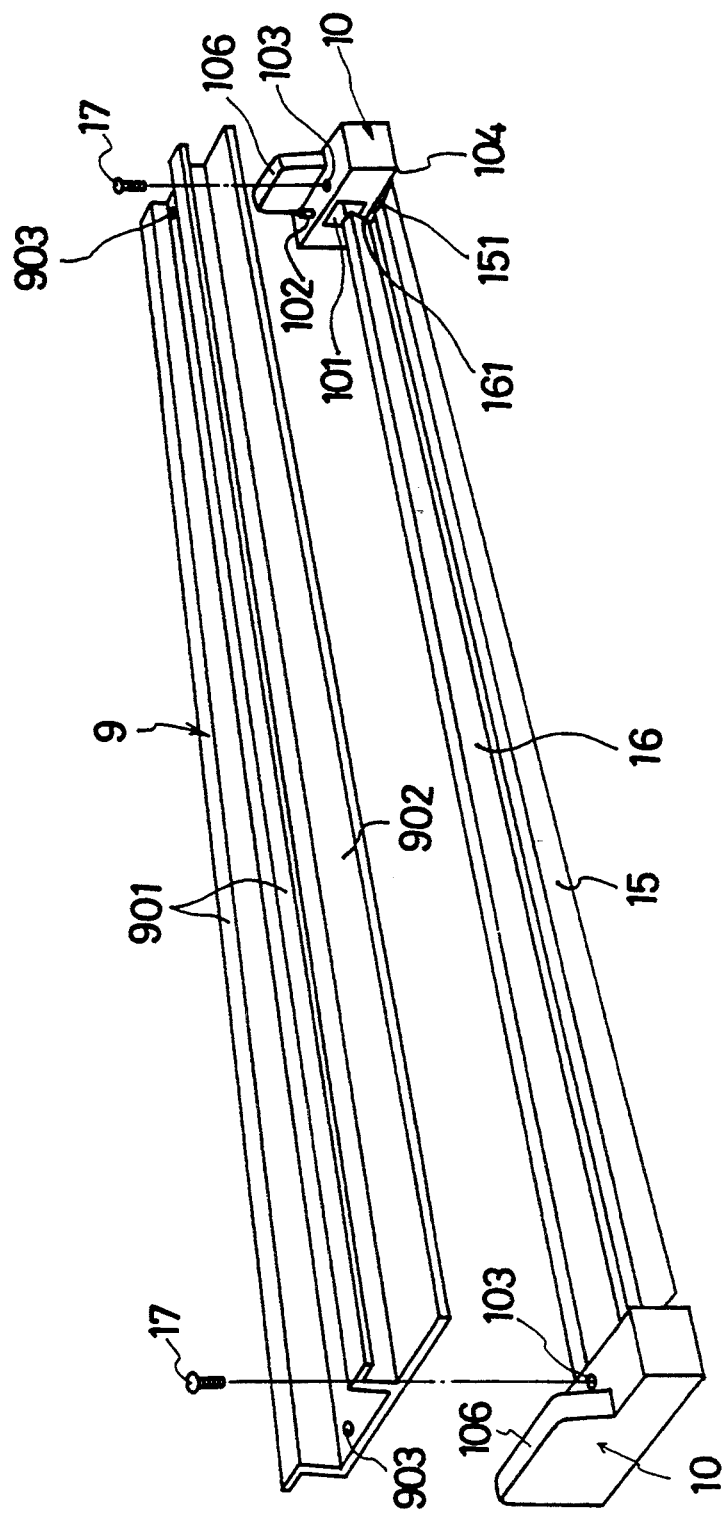
FIG. 3 is an exploded perspective view showing the assembly of a rail, supports and actuation levers.

The present invention will be described in the following in connection with one embodiment with reference to the accompanying drawings, in an example in which it is applied to a paper cutting machine. Between the rail supports 10 of the paper cutting machine, as shown in FIG. 3, there are interposed two actuation levers 15 and 16 which will be described hereinafter. These two actuation levers 15 and 16 are formed at their respective end portions with slopes 151 and 161, the slope 151 abuts against a corner 104 of the rail support 10 whereas the slope 161 abuts against the bottom edge of a hole 101 formed in the side face of the rail support 10, as will be detailed hereinafter.

Figure 1:
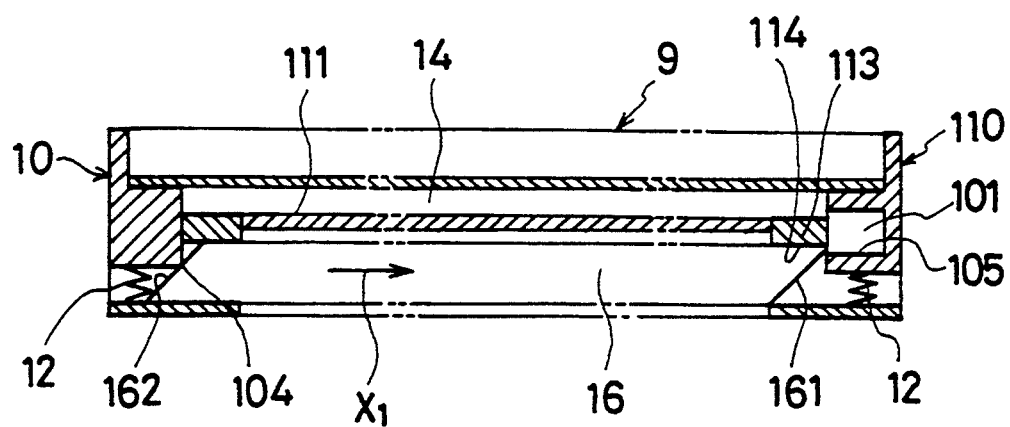
FIG. 1 is a longitudinal section showing one embodiment of the present invention.
Figure 2:
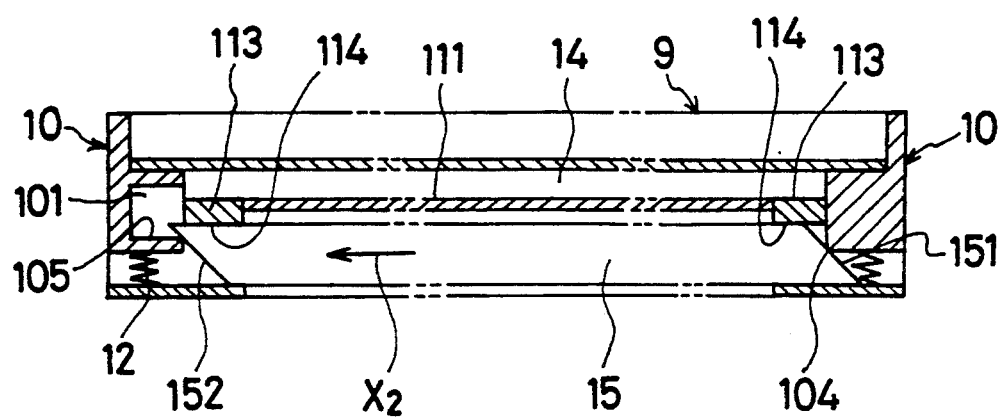
FIG. 2 is a longitudinal section showing the embodiment of the present invention.

In FIG. 1, the actuation lever 16 has slopes 161 and 162 inclined in the same direction. In FIG. 2, the actuation lever 15 also has slopes 151 and 152 inclined in the same direction, which is opposite from the inclination of slopes 161, 162. Moreover, these actuation levers 15 and 16 are arranged so that the directions of inclination of their slopes 151 and 161 are opposed to each other. As a result, the slopes 152 and 162 are also inclined opposite to each other.

Figure 5:
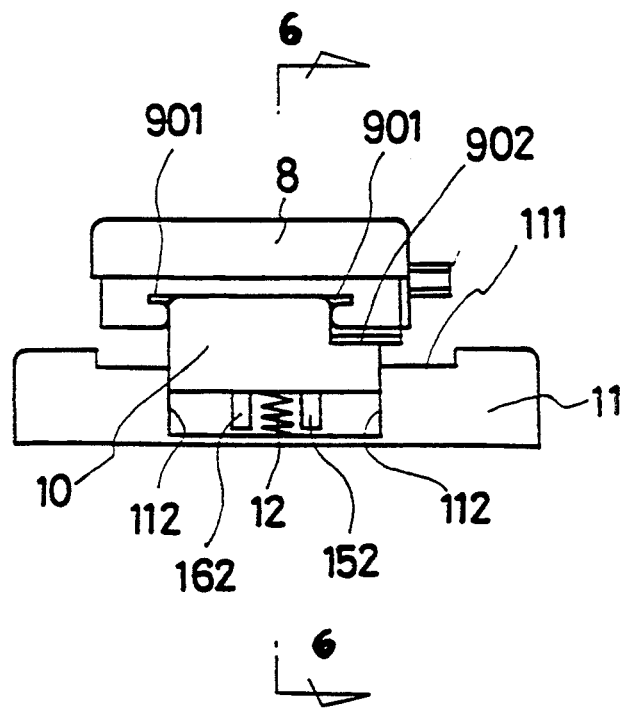
FIG. 5 is a lefthand side view of FIG. 4.

The actuation levers 15 and 16 are individually fitted in guide holes 114 which are formed in the end portions 113 of a bearing member (as will be called "bedplate") 11. The slope 161 of the actuation lever 16 has its leading end portion fitted between the edge of the bottom 105 of the hole 101 and the edge of the top of the guide hole 114, whereas the other slope 162 abuts against the corner 104 of the rail support 10. On the other hand, the slope 151 of the actuation lever 15 abuts against the corner 104 of the rail support 10, whereas the other slope 152 has its leading end fitted between the edge of the bottom 105 of the hole 101 and the edge of the top of the guide hole 114. In FIG. 5, there appear the slopes 152 and 162 which are inserted in the guide holes 114.

Figure 4:
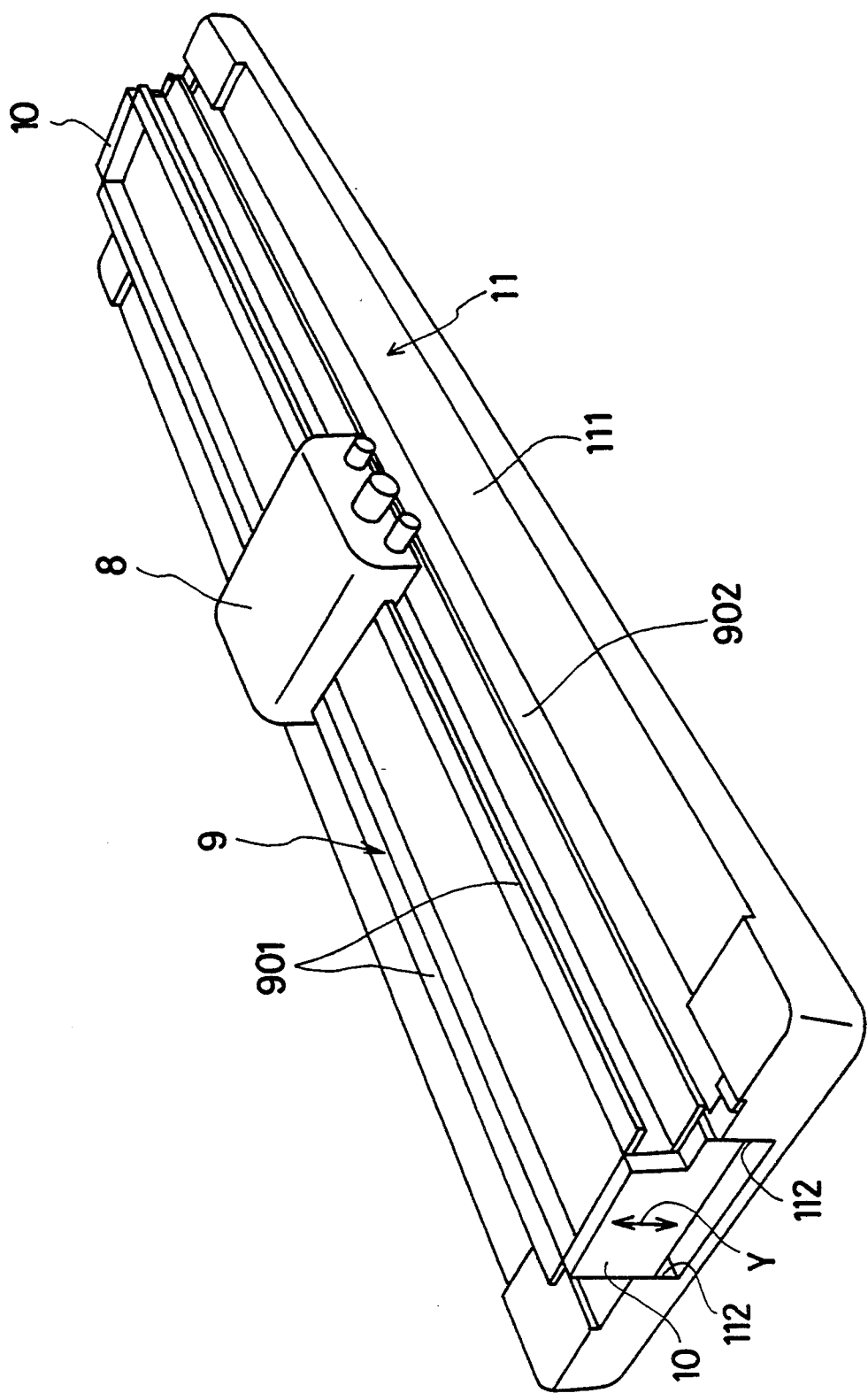
FIG. 4 is a perspective view showing the entirety of a paper cutting machine.

In FIG. 4, a rail 9 has its two ends supported by the rail support 10, which are attached to the bedplate 11 so that it can move up and down along guide faces 112, as indicated by arrow Y. As a result, the rail 9 can be brought through the rail supports 10 toward and apart from the cut paper stacking face 111 of the bedplate 11 while being positioned in parallel with the paper stacking face 111. The rail 9 has two rail faces 901 and is integrated with a paper holding portion 902. Reference numeral 8 designates a slider which is guided to move by the rail faces 901 and equipped with a rotary blade (as should be referred to Japanese Utility Model Application No. 26776/1988).

Figure 6:
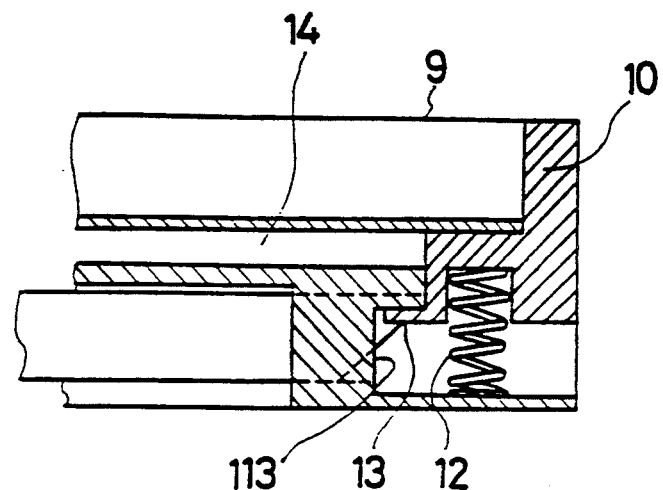
FIG. 6 is a longitudinal section taken along line 6—6 of FIG. 5 and showing a portion of the same.
Figure 7:
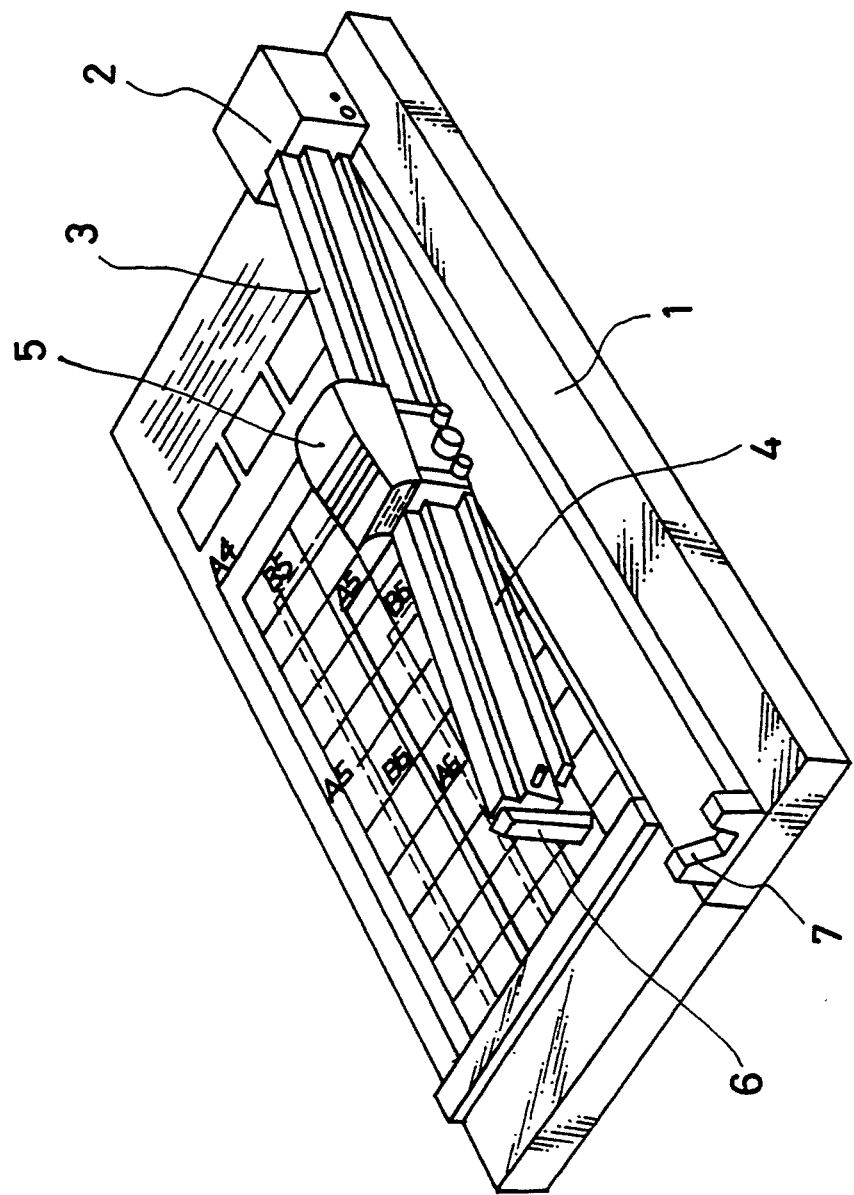
FIG. 7 is an explanatory, perspective view showing a paper cutting machine of the prior art.

As shown in FIGS. 5 and 6, the rail supports 10 are normally urged upward by the elastic forces of springs 12. These urging forces are received when tongues 13 formed integral with the rail supports 10 are retained on the tops of recesses 113 which are formed in the bedplate 11. As a result, the rail supports 10 are stopped at a predetermined height to establish clearances 14 between the paper holding portion 902 and the paper stacking face 111 for receiving the cut sheets of paper.

The following description discusses the assembly of the paper cutting machine. As shown in FIGS. 1 and 2, the actuation levers 15 and 16 are inserted into the guide holes 114 formed in the bedplate 11, and the rail supports 10 are fitted on the guide faces 112 formed on the bedplate 11. As a result, the slopes 151 and 152 of the actuation lever 15 and the slopes 161 and 162 of the actuation lever 16 are positioned, as shown in FIGS. 1 and 2, relative to the bedplate 11 and the rail supports 10. Next, positioning pins 102 anchored at the rail supports 10 are fitted in positioning holes 903 formed in the rail 9, as shown in FIG. 3, and the rail 9 is fixed by means of screws 17. As a result, the rail 9 is fixed with its end faces abutting against the walls 106 of the rail supports 10, thus completing the assembly.

The following description details the operation of the present embodiment once assembled. If the rail 9 is depressed, as shown in FIGS. 1 and 2, the corner 104 of the rail supports push the slope 162 to move the actuation lever 16 in the direction of arrow $X_1$. In accordance with the movement of the actuation lever 16, the slope 161 has its leading end forced in a wedge shape between the edge of the bottom 105 of the hole 101 and the top edge of the guide hole 114 so that the other end portion of the rail 9 is pulled down along the slope 161. This pull-down force of the slope 161 acts as a force for pushing the slope 151 of the actuation lever 15 with the corner 104 of the rail support 10. As a result, the actuation lever 15 is moved in the direction of arrow $X_2$ (opposed to the arrow $X_1$) so that its slope 152 has its leading end forced in a wedge shape between the edge of the bottom 105 of the hole 101 and top edge of the guide hole 114 so that the other end portion of the rail 9 is pulled down along the slope 152.

The pull-down force exerted upon the end portion of the rail 9 by the slope 152 also acts to pull down the slope 162 of the actuation lever 16 by the corner 104 of the rail support 10. Due to the organic relationships between the actuation levers 15 and 16, even if any portion such as one end portion (e.g., the rail support 10) of the rail is depressed, the actuation levers 15 and 16 individually move in the directions $X_2$ and $X_1$ so that the other end of the rail 9 is pulled down to the same extent. As a result, the rail 9 is moved down always by an equal distance at its two ends so that it goes down correctly at a right angle with respect to the paper stacking face 111 of the bedplate 11.

Thus, the rail 9 is always pushed down in parallel with the paper stacking face 111 of the bedplate 11 no matter what position the slider 8 shown in FIG. 4 might be slid to push the rail 9 downward. Here, the paper to be cut is set in the clearance 14 and is cut while the rail 9 is depressed by the slider 8. Then, the paper can be pushed and held on the paper stacking face 111 by the vertical force through the paper holding portion 902 which is formed integrally with the rail 9.

Next, if the slider 8 is released from its depressing force after the end of the cutting operation, the rail 9 is raised at its two ends by the elastic forces of the springs 12. By these push-up forces of the springs 12, the slopes 161 and 152, which are fitted in the wedge shapes between the edge of the bottom 105 of the hole 101 and the top edge of the guide hole 114 are pushed by the edge of the bottom 105 so that the actuation levers 15 and 16 are moved in the directions opposite to the arrows $X_2$ and $X_1$ to restore their initial positions. Since the two ends of the rail 9 are supported by the rail supports 10 in parallel with the paper stacking face 111, the cutting position can be easily determined by the edge of the paper holding portion 902. Moreover, since the rail 9 moves normal to the paper stacking face 111, the paper placed on the paper stacking face 111 will not go out of position even if the rail 9 is depressed to determine the cutting position. Thus, it is possible to determine the cutting position accurately.

As has been described in detail hereinbefore, according to the present invention, the driven member is in abutment against the slopes on one side of the actuation levers. As a result, if the driven member, which is movable at a right angle relative to its supports, is depressed, this push-down force can be converted into the horizontal force to move the actuation levers horizontally by their aforementioned slopes that abut the driven member. Moreover, the two parallel actuation levers have their individual two end portions supported slidably by the supports and their other sloped ends fitted between the supports and the drive member. As a result, the actuation levers are horizontally moved by the horizontal force to have their other sloped ends fitted between the supports and the driven member so that the horizontal force can be converted into a force to pull down the driven member.

Moreover, each of the two actuation levers is formed at its two ends with the slopes. The slopes on the same actuation lever extend in the same direction. These two actuation levers are arranged so that the directions of inclination of the slopes formed at the two ends of one actuation lever are opposed to the directions of inclination of the slopes formed at the two ends of the other actuation lever. As a result, the pull-down force of the driven member is converted by the driven member, which is in abutment against the slope of the other of the two parallel actuation levers, into the horizontal force, which can be converted into the pull-down force to pull down the driven member through the other slope fitted between the supports and the driven member.

Thus, the push-down force to be applied through the driven member to one slope of one of the two parallel actuation levers is converted into a pull-down force to pull down the driven member by the other slope. This force to pull-down the driven member acts as the force for pushing one slope of the other of the two parallel actuation levers. This pushing force is converted through the slope into the horizontal force, which can be converted by the other slope of the other actuation lever into the force to pull down the driven member. As a result, the driven member can be vertically moved up and down while keeping its horizontal position even if it is depressed at an arbitrary position.

What is claimed is:

1. A device comprising:
    a first actuation lever having a first, upward-facing sloped end portion and a second, downward-facing sloped end portion, the first and the second sloped end portions having a same direction of inclination;
    a second actuation lever having a first, upward-facing sloped end portion and a second, downward-facing sloped end portion, the first and the second sloped end portions of the second actuation lever having a same direction of inclination;
    the first and second actuation levers being juxtaposed such that the first sloped end portion of the first actuation lever is adjacent to the second sloped end portion of the second actuation lever, and the second sloped end portion of the first actuation lever is located adjacent to the first sloped end portion of the second actuation lever;
    a bedplate having a first guide member and a second guide member fixed on the bedplate for guiding the first and second actuation levers to slide horizontally;
    a first drive member mounted on said first guide member and vertically movable relative to said bedplate, a second drive member mounted on said second guide member and vertically movable relative to said bedplate, compression springs between said bedplate and said first and second drive members for biasing said drive members upward to a predetermined upper position;
    a lower portion of said first drive member abutting against the first sloped end portion of said first actuation lever, said first drive member also abutting against the second sloped end portion of said second actuation lever;
    a lower portion of said second drive member abutting against the first sloped end portion of said second actuation lever, said second drive member also abutting against the second sloped end portion of said first actuation lever; and
    a rail fixed to the drive members extending parallel to the bedplate in a horizontal position, whereby upon depression of the rail, the actuation levers are moved horizontally in opposite directions by the drive members to cause the rail to move vertically such that the rail remains parallel to the bedplate.

2. The device according to claim 1, further comprising a slider having a rotary blade which is slidable along said rail.

3. The device according to claim 2, wherein the rail has a paper holding plate integrated therewith.

* * * * *